United States Patent
Perreira et al.

(10) Patent No.: US 9,843,531 B2
(45) Date of Patent: Dec. 12, 2017

(54) ASYNCHRONOUS FRAMEWORK FOR MANAGEMENT OF IAAS

(71) Applicant: HEWLETT PACKARD ENTERPRISE DEVELOPMENT LP, Houston, TX (US)

(72) Inventors: Mark Perreira, Sunnyvale, CA (US); Bryan P. Murray, Duvall, WA (US); Rajeev Bharadhwaj, Sunnyvale, CA (US); Stephane Herman Maes, Fremont, CA (US)

(73) Assignee: HEWLETT PACKARD ENTERPRISE DEVELOPMENT LP, Houston, TX (US)

( * ) Notice: Subject to any disclaimer, the term of this patent is extended or adjusted under 35 U.S.C. 154(b) by 240 days.

(21) Appl. No.: 14/646,121

(22) PCT Filed: Dec. 3, 2012

(86) PCT No.: PCT/US2012/067588
§ 371 (c)(1),
(2) Date: May 20, 2015

(87) PCT Pub. No.: WO2014/088541
PCT Pub. Date: Jun. 12, 2014

(65) Prior Publication Data
US 2015/0295844 A1    Oct. 15, 2015

(51) Int. Cl.
*G06F 15/173* (2006.01)
*H04L 12/911* (2013.01)
(Continued)

(52) U.S. Cl.
CPC ............ *H04L 47/70* (2013.01); *G06F 9/4843* (2013.01); *G06F 9/5072* (2013.01); *H04L 41/14* (2013.01); *H04L 67/10* (2013.01)

(58) Field of Classification Search
None
See application file for complete search history.

(56) References Cited

U.S. PATENT DOCUMENTS

| 8,250,215 B2 | 8/2012 | Stienhans et al. | |
| 8,977,754 B2 * | 3/2015 | Curry, Jr. | G06Q 30/08 709/226 |

(Continued)

FOREIGN PATENT DOCUMENTS

| CN | 101866286 A | 10/2010 |
| CN | 102103518 A | 6/2011 |

(Continued)

OTHER PUBLICATIONS

Extended European Search Report dated Jun. 10, 2016, EP Patent Application No. 12889521.6 dated Dec. 3, 2012, European Patent Office, pp. 10.

(Continued)

*Primary Examiner* — Joshua Joo
(74) *Attorney, Agent, or Firm* — Tarolli, Sundheim, Covell & Tummino, L.L.P.

(57) ABSTRACT

A system includes an infrastructure as a service (IaaS) layer to provide a set of infrastructure services to manage computing resources in a cloud computing environment. The system includes a service framework layer, separate from the IaaS layer, the service framework layer comprising an asynchronous interface to communicate with the IaaS layer and to create a framework service to extend the IaaS layer in response to a command from an upper tier service, the framework service to employ the asynchronous interface to utilize an infrastructure service from the set of infrastructure services.

24 Claims, 9 Drawing Sheets

(51) Int. Cl.
  *G06F 9/48*    (2006.01)
  *H04L 12/24*   (2006.01)
  *H04L 29/08*   (2006.01)
  *G06F 9/50*    (2006.01)

(56) References Cited

U.S. PATENT DOCUMENTS

| | | |
|---|---|---|
| 2004/0076187 A1 | 4/2004 | Peled |
| 2010/0042720 A1 | 2/2010 | Stienhans |
| 2011/0010339 A1 | 1/2011 | Wipfel et al. |
| 2011/0231899 A1 | 9/2011 | Pulier |
| 2011/0258692 A1 | 10/2011 | Morrison et al. |
| 2012/0011077 A1 | 1/2012 | Bhagat |
| 2012/0054345 A1 | 3/2012 | Sahu |
| 2012/0102486 A1* | 4/2012 | Yendluri .............. G06F 9/5072 717/177 |
| 2012/0102506 A1 | 4/2012 | Hopmann |
| 2012/0185370 A1 | 7/2012 | Davie et al. |
| 2012/0185913 A1* | 7/2012 | Martinez .............. G06F 9/455 726/1 |
| 2012/0233668 A1* | 9/2012 | Leafe .............. G06F 9/44526 726/4 |
| 2012/0260247 A1 | 10/2012 | Huang et al. |
| 2012/0266170 A1 | 10/2012 | Zimmerman et al. |
| 2012/0290460 A1 | 11/2012 | Curry, Jr. et al. |
| 2013/0111349 A1* | 5/2013 | Yan .............. G06F 9/5072 715/738 |
| 2013/0111500 A1* | 5/2013 | Dixon .............. G06F 9/546 719/314 |
| 2013/0179894 A1* | 7/2013 | Calder .............. G06F 9/5027 718/104 |
| 2013/0219033 A1* | 8/2013 | Agarwala .............. G06F 9/5061 709/222 |
| 2013/0232498 A1* | 9/2013 | Mangtani .............. G06F 9/5072 718/104 |
| 2014/0107925 A1* | 4/2014 | Chang .............. G06Q 90/00 702/3 |

FOREIGN PATENT DOCUMENTS

| | | |
|---|---|---|
| CN | 102447743 A | 5/2012 |
| CN | 102655532 A | 9/2012 |
| CN | 102800038 A | 11/2012 |
| EP | 2172767 A1 | 4/2010 |
| EP | 2439687 A1 | 4/2012 |
| WO | WO-2009155574 A1 | 12/2009 |

OTHER PUBLICATIONS

"Using Windows Server 8 for Building Private and Public IaaS Clouds," (Web Page), Sep. 14, 2011, 5 pages, available at http://www.aidanfinn.com/?p=11693.

Hewlett-Packard Development Company, L.P., "Understanding the HP CloudSystem Reference Architecture," Jun. 2011, 20 pages, available at http://h18006.www1.hp.com/storage/pdfs/4AA3-4548ENW.pdf.

Hostingtecnews, "Red Hat CloudForms: Open Clouds Under Your Control," (Web Page), Jun. 11, 2012, 7 pages, available at http://www.hostingtecnews.com/red-hat-cloudforms-open-clouds-under-your-control.

International Search Report & Written Opinion received in PCT Application No. PCT/US2012/067588, Aug. 27, 2013, 9 pages.

* cited by examiner

ASYNCHRONOUS FRAMEWORK FOR MANAGEMENT OF IAAS

BACKGROUND

Cloud computing refers to the delivery of scalable and pooled computing, storage and networking capability and capacity as a service to a network of end-recipients. The name comes from the use of clouds as an abstraction for the complex infrastructure of networks and associated hardware operative within the cloud. Cloud computing provides services for a user's data storage, software and computation over a network, for example. Such computing capability relies on sharing of resources to achieve coherence and economies of scale similar to a utility (like the electricity grid) over a network (typically the Internet).

One aspect of services to support cloud computing relates to Infrastructure as a Service models (IaaS), where cloud service providers offer computers, as physical or more often as virtual machines, and other computing resources. The virtual machines can be run as guests by a hypervisor service, for example. Management of pools of hypervisors by the cloud operational support system leads to the ability to scale to support a large number of virtual machines. Other resources in IaaS clouds include images in a virtual machine image library, raw (block) and file-based storage, firewalls, load balancers, IP addresses, virtual local area networks (VLANs), and software bundles.

DETAILED DESCRIPTION

Systems and methods provide enhanced cloud services by controlling an elemental Infrastructure as a Service (IaaS) layer that operates cloud resources. In one example, an IaaS offers individual resources as a service such as a server, a virtual machine, storage instance, or network instance but typically does not combine such resources. The user typically has to manually configure and combine the resources. A service framework layer is provided that controls (e.g., provision/instantiate and manage lifecycle) an underlying IaaS layer by creating services in the service framework layer and utilizing an asynchronous interface to issue commands to the IaaS layer to implement the respective services. Such commands allow for the creation of framework services that are not directly offered by the IaaS layer. The framework services can include creation of services that support heterogeneous, hybrid and multi-tenant cloud resources, resource pools and applications (public and/or private) by providing methods to identify resource pools for cloud regions and domains and providing methods to select and/or provision such resources. For example, this can include complex infrastructure provisioning via asynchronous topology definition, binding to resources in pools, and associated provisioning. The asynchronous methods also enable "cloud scalability" (e.g., ability to process a large scale of resources to manage that also includes the ability to scale a corresponding amount of management requests with such resources).

Figure 1:
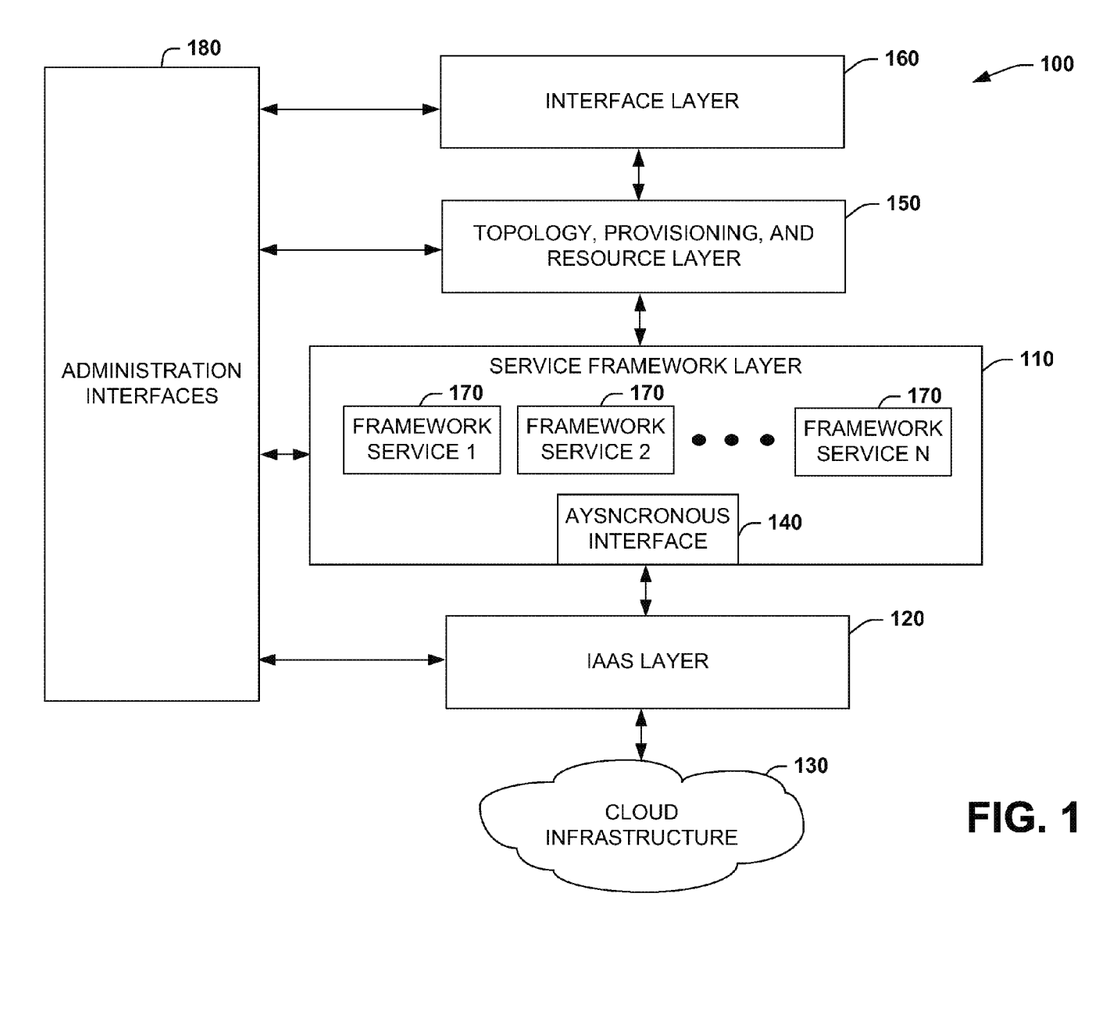
FIG. 1 illustrates an example of a system that provides a service framework layer to control an elemental Infrastructure as a Service layer for cloud applications.

FIG. 1 illustrates an example of a system 100 that provides a service framework layer 110 to control an elemental Infrastructure as a Service (IaaS) layer 120 for cloud applications. As used herein, the term IaaS can refer to any lower level tier service that controls resources identified as a cloud infrastructure 130 (or portions thereof). Such resources can include processors, memory, servers, software, applications, and so forth as well as IaaS services (e.g., security, image management) that cooperate to provide cloud computing capabilities for users who desire to exploit cloud resources rather than provide them on their own. Furthermore, the term layer can refer to any collection of instructions executable by a processor that cooperate to provide a service. In one example, the IaaS layer 120 could be an OpenStack technology as shown and described below with respect to FIG. 2. OpenStack is a modular, open source, cloud computing project, which is known as the OpenStack Project and supported by numerous companies, available under license from the OpenStack Foundation (see, e.g., www.openstack.org). In other examples, the IaaS layer 120 can be implemented according other technologies (e.g., proprietary, commercial or open source), such as including VMWare, Eucalyptus, Amazon AWS, Azure, Citrix technologies, HP Matrix and the like.

The IaaS layer 120 provides a set of infrastructure services to manage computing resources in a cloud computing environment 130. The service framework layer 110 is separate from the IaaS layer 120 and includes an asynchronous interface 140 to communicate with the IaaS layer via asynchronous messages and it can be implemented with asynchronous programming patterns. As used herein, the term "asynchronous" refers to asynchronous-based programming where messages/tasks are non-blocking to the service framework layer 110 and associated upper tier layers, wherein tasks can be defined and queued for execution at those respective layers without waiting for completion from the IaaS layer (or other layers). Thus, the asynchronous interface 140 is asynchronous since the associated interface logic then does not have to wait for its completion (blocking behavior) but instead performs scheduling of other tasks until it is notified that a result or error event is available (e.g., by processing a queue of responses from the IaaS).

The service framework layer 110 can then proceed to the next task based on what it was programmed to perform before the previous task was complete. The scalability of this method flows from providing such non-blocking behavior at the service framework layer 110. In general, no matter how many requests are received and no matter how long each request requires to process at the IaaS layer 120, they can be parallelized since they are non-blocking to other tasks that may need to occur at upper tier layers above the IaaS. Thus, asynchronous protocols can be employed to extend the base services offered on the IaaS layer 120 and to orchestrate IaaS management while creating new services (e.g., framework services 170) that do not presently exist on the IaaS layer. In another example, waiting for a response from the IaaS can also be supported.

As shown, the service framework layer creates a framework service 170 (shown as Framework Services 1-N, with N being a positive integer) responsive to a command from an upper tier service such as the topology, provisioning, and resource layer 150, and/or interface layer 160. The framework service 170 employs the asynchronous interface 140 to create a corresponding infrastructure service (or platform service operating in accordance with the infrastructure) in addition to the base set of infrastructure services in the IaaS layer 120. Although shown in the service framework layer 110, the framework service 170 could also be issued as a set of commands to execute in the IaaS layer 120 (e.g., instructions executable by a processing resource). This could also include hybrid execution wherein portions of the framework service 170 are executed in the service framework layer and portions executed in the IaaS layer.

As will be described herein, the framework services 170 can be used to develop and provide functionality that is not offered by the underlying IaaS layer 120. Such framework services 170 can include support for multitenant cloud applications and hybrid deployments which can include support for public, private, and/or managed cloud applications and/or configurations and hybrid combinations. The framework services 170 can also provide heterogeneous applications support, wherein different vendors and software applications can issue requests to the common framework provided by the service framework layer 110. In one example, the framework service 170 can be created to manage a given IaaS (e.g., built with a given technology or for a given vendor HW or virtual resource vendor). In another example, it is possible to use the framework service 170 to control an IaaS from another vendor (e.g., other technologies such as Open Stack, Amazon, VMWare and the like).

Other framework services 170 can include dynamic binding, multiple versioning support, and support for application lifecycle management built on the framework. This can also include support for differing resources, deployment models, and tenancy models.

As will be shown and described herein, the system 100 can include a set of administration/design/management interfaces at 180 for interacting with the various layers described herein. As a particular example of services implemented on the service framework layer 110, the interface layer 160 can be programmed to understand and manipulate various templates and topology models passed as request (from above) or designed by a designer interface that define cloud resources and configurations which are passed to the topology, provisioning, and resource layer 150. The topology, provisioning, and resource layer 150 can be built on/using the 110 framework layer to interpret the templates and topologies that it received via requests or designer/administrator to orchestrate the IaaS layer 120 APIs. The topology, provisioning, and resource layer 150 can translate the requests as issued commands and as it is built on the service framework layer 110, use the service framework layer 110 to issue commands via the asynchronous interface 140 to the IaaS layer 120 to implement the template or topology it is requested to implement.

For purposes of simplification of explanation, in the example of FIG. 1, different components of the system 100 are illustrated and described as performing different functions. However, one of ordinary skill in the art will understand and appreciate that the functions of the described components can be performed by different components, and the functionality of several components can be combined and executed on a single component. The components can be implemented, for example, computer executable instructions, hardware (e.g., an application specific integrated circuit or other processing resource), or as a combination of both. In other examples, the components could be distributed among remote devices across a network. As used herein, instructions can be stored in a non-transitory computer readable resource (e.g., a medium) executable by a processing resource. Each of the processing and memory resources can exist on a single device or be distributed across multiple devices, such as a data center, or a cloud environment.

In one example, topologies can be defined by the interface layer 160 where an applications template can include a topology model of which application components should be deployed (e.g., what component to be deployed at which location in the cloud) for a given application. As a further example, a deployment manager (illustrated and described below) could be provided with a topology model for a given application (e.g., comprising models and various infrastructure resources) and then determine the infrastructure resources in the cloud 130 that substantially match the topology model instantiated for the given application. In another example, after provisioning of the resources and deployment of the application components for a given application, then a topology instance can be created for the given application. The topology instance can be stored and used for later management and/or monitoring, such as disclosed herein.

Figure 2:
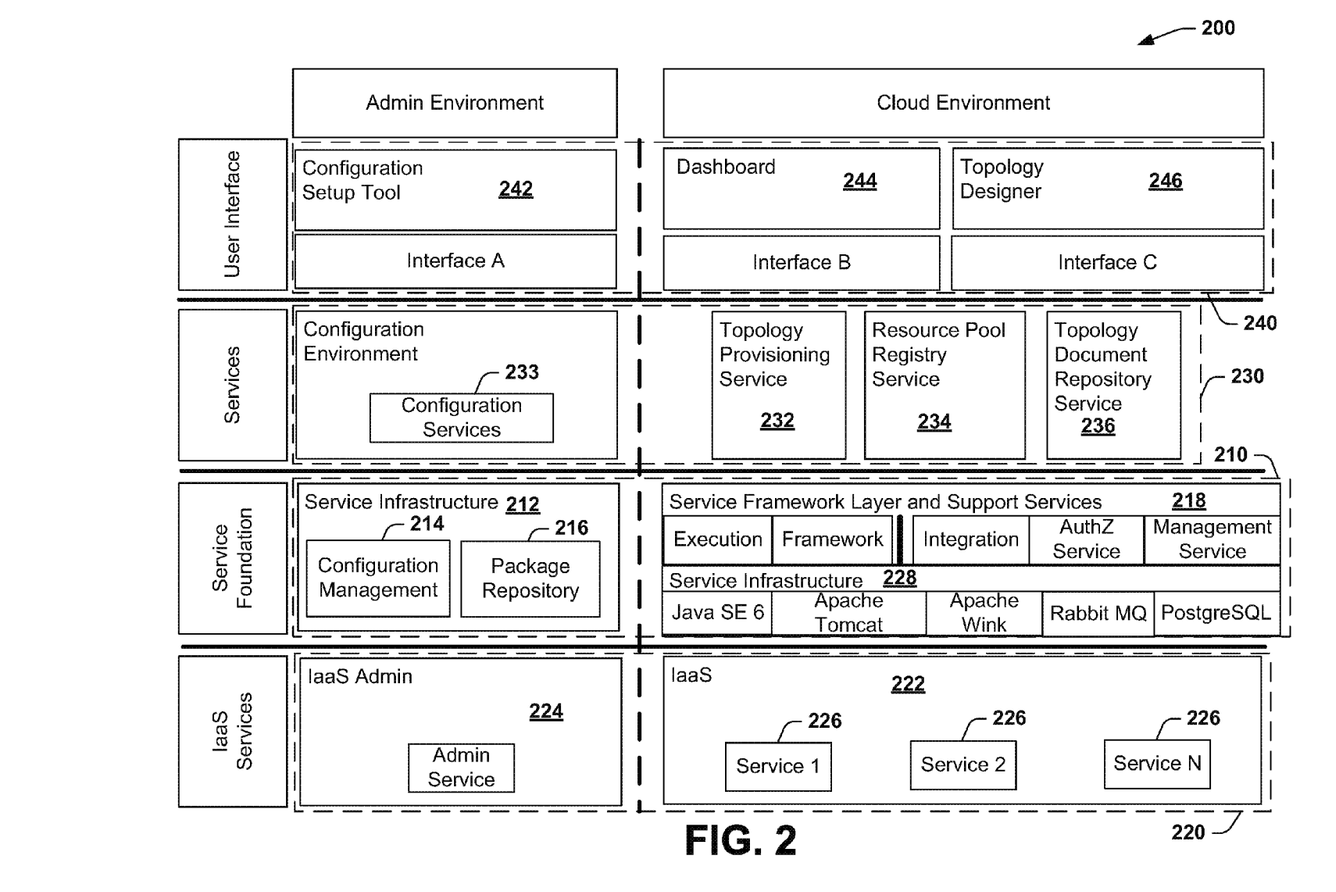
FIG. 2 illustrates an example of a system that provides a service framework layer to manage an IaaS layer for cloud applications.

FIG. 2 illustrates an example of a system 200 that provides a service framework layer 210 to manage an IaaS layer 220 for cloud applications. The IaaS layer 220 includes an IaaS component 222 having an administration service 224 for configuration of the IaaS. The IaaS component 222 in the layer can include various base services 226 shown as services 1-N, with N being a positive integer. Such open stack services 226 can include a compute controller service, and identity and access manager service, a cloud image catalog service, storage management, and network management for example.

The service framework layer 210 can include a service infrastructure administration component 212, which can include cloud configuration management services 214 and cloud package repository services 216. The service framework layer 210 can include support for various cloud services 218. In some examples, the cloud services 218 of the service framework layer 210 can include execution services, framework services, integration services, authorization services, and cloud management service as shown. Service infrastructure 228 in the service framework layer 210 can include examples such as JAVA SE services, Apache Tomcat and Wink services, support for Rabbit MQ asynchronous communications, and SQL database management services. Other infrastructure services can be provided than the specific examples shown to interface with the underlying IaaS layer 220—an open stack layer in this example.

The service framework layer 210 includes services for building and deploying web-scale, stateless, thread controlled, non-blocking coarse-grained services. Such services provide long running execution, multi-tenancy and rolebased security support services, for example. As shown, the services can be integrated with IaaS for identity management services. This service framework layer 210 can facilitate the development of asynchronous services that follow the IaaS asynchronous pattern using a message Queue like RabbitMQ in one example where the IaaS is OpenStack based. With the service framework layer 210, it is possible to complement IaaS with new coarse grain services (services created and built on top of lower level services). The coarse grain services, for example, can represent new system capabilities available as a service which were previously unavailable in the underlying IaaS. This service framework functionality can include differentiating services of the infrastructure that a vendor may want to expose. In some examples, the exposed services can include Disaster Recovery (DR), capacity analytics, chargeback, security, memory backup and memory restore. This can also include variation of capabilities of an existing resource that cannot be exposed via the existing IaaS services, for example.

In the example of FIG. 2, a topology, provisioning and resource layer 230 includes a configuration environment administration component 231. The configuration environment administration component 231 can include one or more configuration services 233 to aid administrators to manage cloud services in the layer 230. For example, the cloud services can include a topology provisioning service 232, a resource pool registry service 234, and a topology document repository service 236. The topology service can receive topology templates from an interface layer 240 that describes various cloud topologies. The registry service can configure various hardware components to operate a given cloud configuration. This can include support for the registry and description of resource pools and their qualities (e.g., Network Type—Flat or VLAN, and so forth) and capabilities (e.g., Network System—O~S Nova API or O~S Quantum API, and so forth). The registry service also provides a common API for abstracting the different resource pool capabilities (e.g., network segmentation—Nova Security or Quantum Network).

The document repository service 236 can manage different configurations that can be provisioned on the cloud (e.g., below the IaaS layer 220)—virtual and physical. This can include providing a registry and lookup for Infrastructure Topology Documents (e.g., Types, Templates, Bindings, and so forth). The document repository service 236 can be provided as a plug-in model and can support various underlying storage and repository types.

As shown, the interface layer 240 can specify various topologies and templates that can be utilized to provision and enable cloud services via the lower service levels. A configuration setup tool 242 having an interface A can be used by administrators to define interface capabilities of the interface layer 240. This can include support and interfacing to Virtual Appliance Delivery Models. This can also include support for bare-metal provisioning and cloud service configuration management utilizing Open Stack Crowbar, for example, and an included software package repository. The configuration setup tool can also include administration console and value-added service administrator interface views of various cloud configurations.

A dashboard component 244 employs an interface B to implement lower layers. The dashboard component 244 can provide an environment to configure templates to define a cloud topology for the topology, provisioning, and resource layer 230. The topology designer 246 enables users to define systems that can be potentially provisioned on the cloud. The topology designer 246 also defines a concrete configuration to provision (configure and instantiate) at the IaaS level. The topology designer 246 supports defined node types and relationships for a given topology. This can include generating infrastructure topology templates that can be utilized by lower tier levels of the system 200. This can also include a binding service that provides methods to specify the binding of abstract topologies to resource pools for input to the topology provisioning service. Various aspects of the layers 210, 220, 230 and 240 will now be described herein with respect to FIGS. 3-8.

Figure 3:
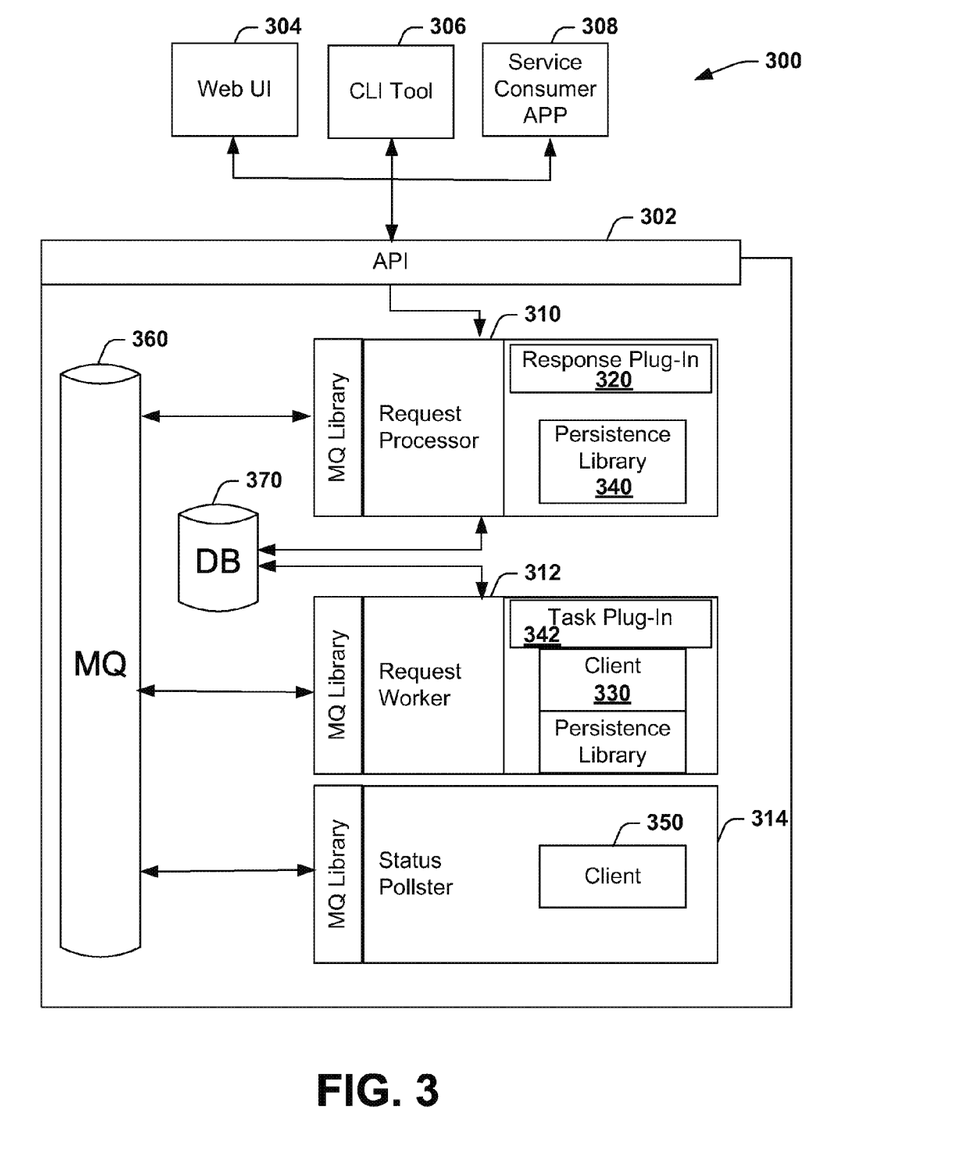
FIG. 3 illustrates an example system 300 providing a framework in which a new asynchronous coarse grain service can be defined that is not provided by the underlying IaaS layer.

FIG. 3 illustrates an example system 300 for providing a framework in which a new asynchronous coarse grain service can be defined that is not provided by the underlying IaaS layer. The system 300 facilitates development of the course-grained service and includes logic defined to receive API requests from an API 302 (e.g., from another component or from layer above or from a portal). As shown, a Web UI 304, a command line interpreter (CLI) tool 306, and/or a service consumer application 308 are examples that can generate such requests. The requests are received by a request processor 310 which receives and/or put the requests from a queue and which initiates logic to address the request. The request processor 310 defines a task that is put on the queue, where a request worker 312 processes the request and spawns tasks there from. A status pollster 314 is informed to monitor (polling) for completion (or error) results from the request worker 312 and are put on queue for a response plug-in 320 to process (e.g., return answer to request or progress to next task).

The API 302 and service framework can be used as a pattern template and form to develop new services which do not exist on an underlying IaaS. For example, a component can be provided for resource provisioning and management according to a topology that can be implemented by developing components for the response plug-in 320 and a client 330 on the request worker 312. The tools 304 through 308 the request processor 310 to interact via APIs 302 with this new service (by calling its API as defined by the response plug-in 320.

A shown, the request processor 302 can include an MQ (Message Queue) library interface and a persistence library of functions at 340. This can also provide shared database access for responses and asynchronous message queue access. The request worker 312 can include a thread-pooled, asynchronous work controller for task plug-ins shown at 342. This can also include shared database access for task work and to enable service clients 330 to call other services. This can also provide message queue access for resource status polling. The status pollster 314 can provide thread-pooled, generalized resource status polling. For example, this can include a service client 350 to check status and provide message queue access to the database 360 to reinitialize work. As shown, the request processor 310 and request worker 312 can also employ a database 370 for additional communications and persistence across tasks.

Figure 4:
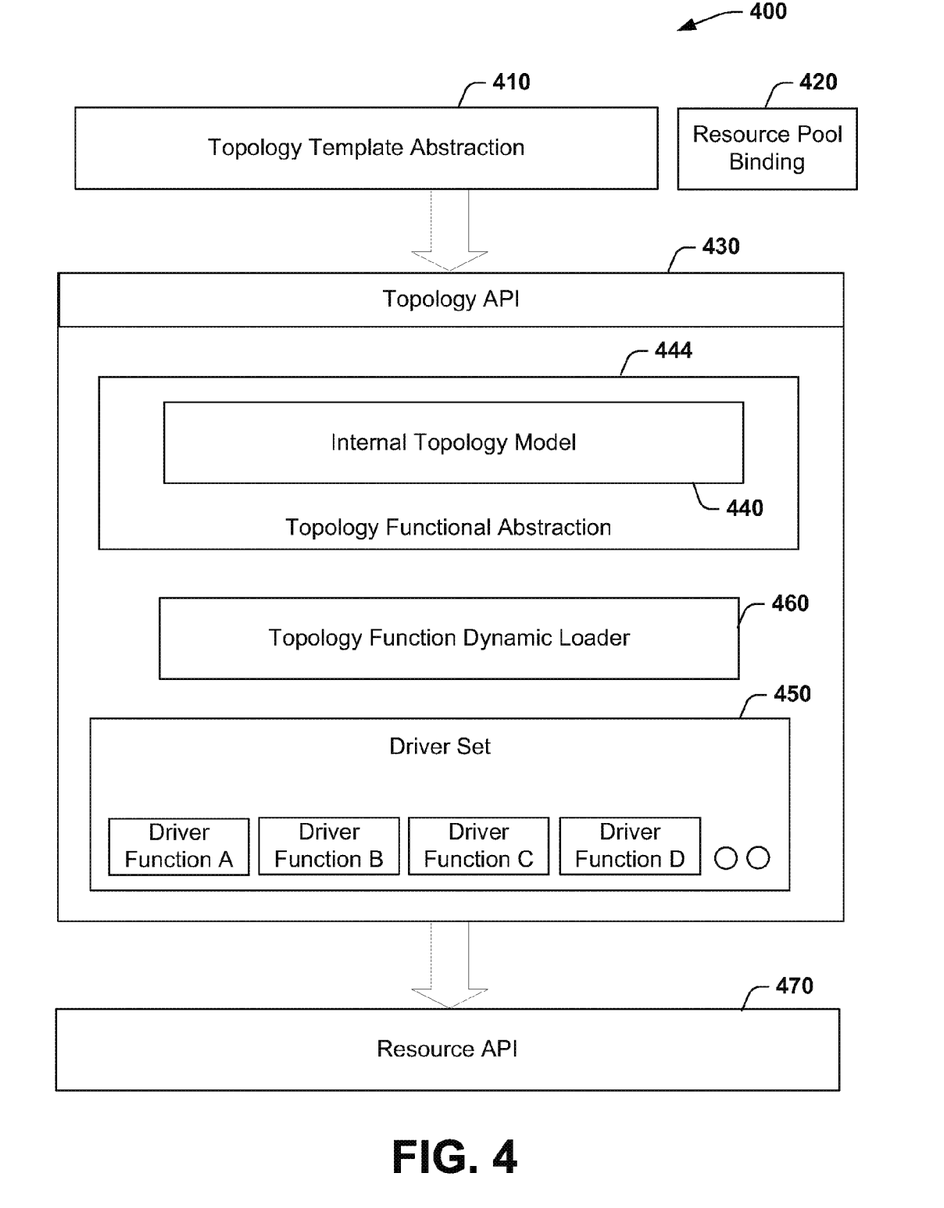
FIG. 4 illustrates an example topology provisioning service to interact with a service framework layer.

FIG. 4 illustrates an example topology provisioning service 400 built on a framework service. The service 400 enables provisioning of infrastructure via creation of topology templates. Topologies can describe infrastructure elements (node types) to be provisioned and relationships between these elements. This can include lifecycle management recipes that specify how these resources and the relationships can be setup, such as can be defined in substantially any computer language.

Separate template creation and resource pool binding can be provided for simpler and re-usable templates via a topology template abstraction interface 410 and resource binding pool 420. These components may be used by a designer tool to generate the template and binding (or both) or one can be exchanged from another system and received via the abstraction interface 410. The binding can consist of explicitly pointing what IaaS pool (domain/region) and what API/service is to be used to realize the topology (e.g., can be what realization of the API to use—in the example of an OpenStack IaaS it could be also select the OpenStack plug-ins to use). The abstraction interface 410 and binding pool 420 can submit abstract topologies to a topology API 430 to create an internal topology model 440. This is the binding topology which forms part of an overall topology functional abstraction 444. The respective topology can be abstracted to a set of functional steps that are loaded as various drivers in a driver set 450 via a dynamic loader 460. Each step can be dynamically loaded as a driver that matches the function interface and binding definition received from the upper interface layers. The driver interface for a function accepts a fragment of the internal topology model 444. The driver set 450 can then be then transformed into commands provided to a resource API 470, for example.

The topology API 400 can be integrated via a plug-in model with Cloud IaaS API's (e.g., Open Stack Nova or possibly any other service built on framework) for orchestrating elemental provisioning to provide composite, hybrid and distributed infrastructures topologies, for example. In one example, plug-ins are different drivers to realize the IaaS APIs (Services) (e.g., OpenStack) on different underlying resources (different vendors, technologies service providers, location, and the like). The API 400 also supports the creation and configuration of network services such as virtual load-balancers and configuration management services, for example.

Figure 5:
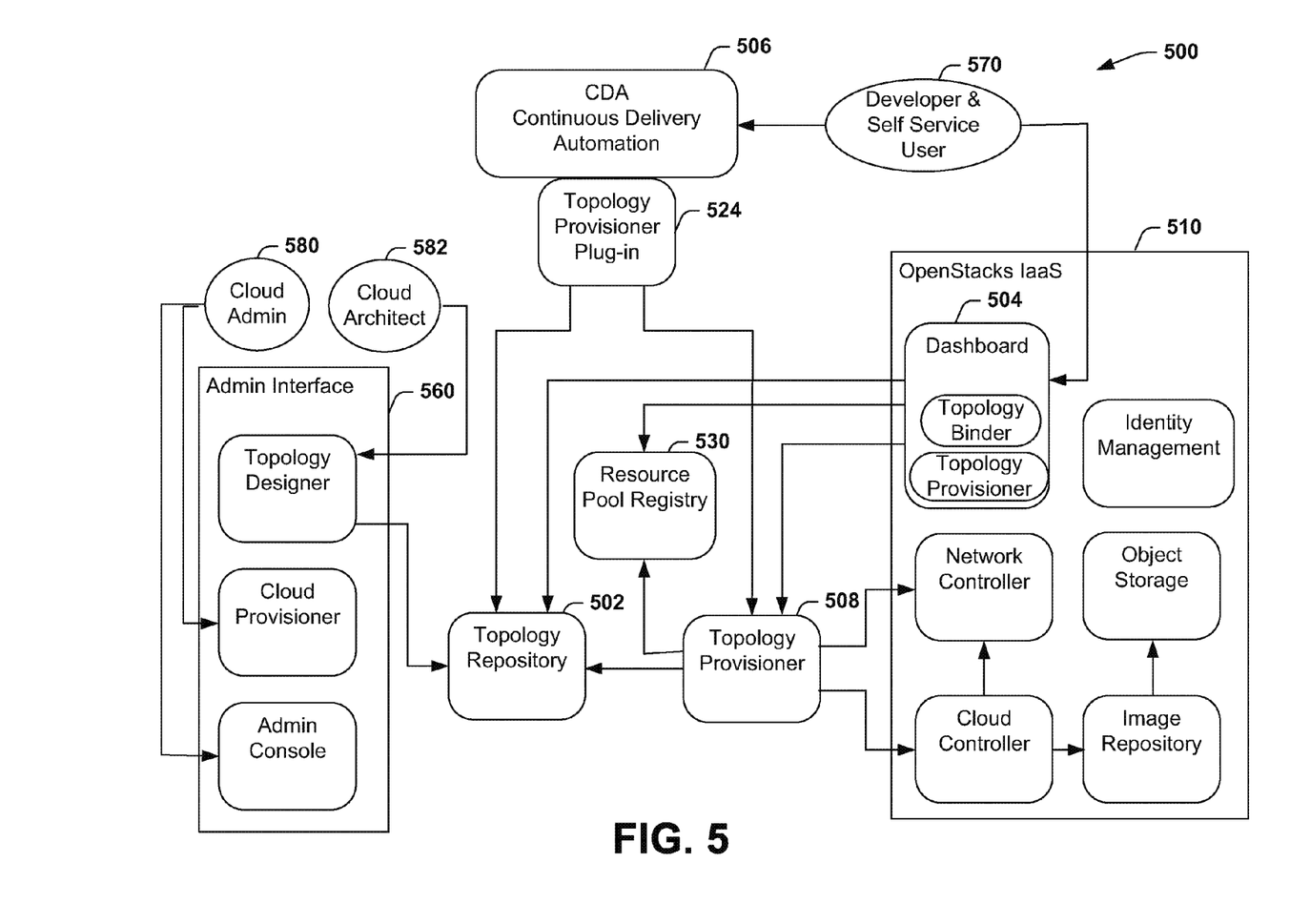
FIGS. 5 and 6 illustrate service framework examples wherein a service framework can be integrated with an automated deployment system that is illustrated in and described with respect to FIG. 9.
Figure 6:
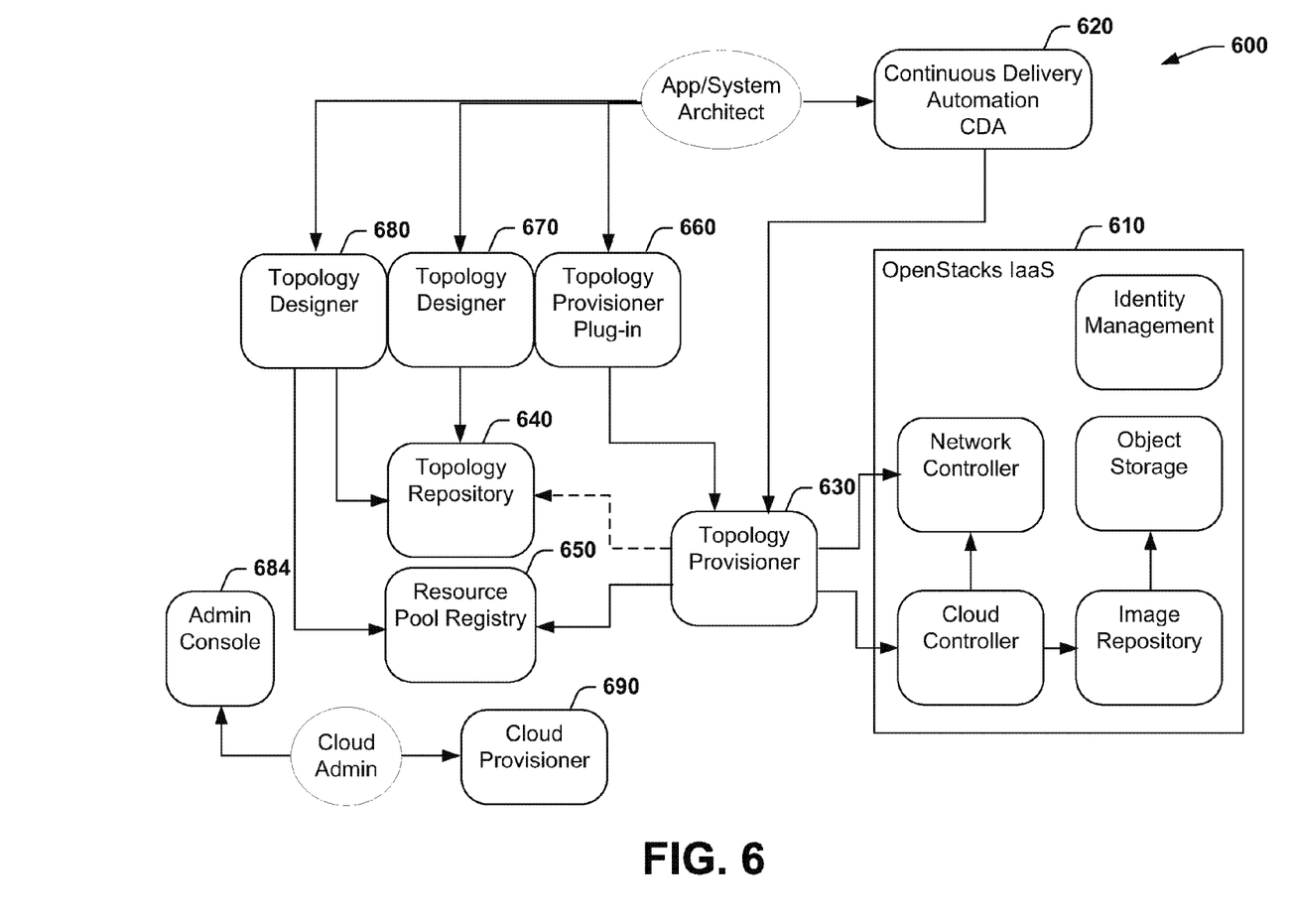
Figure 9:
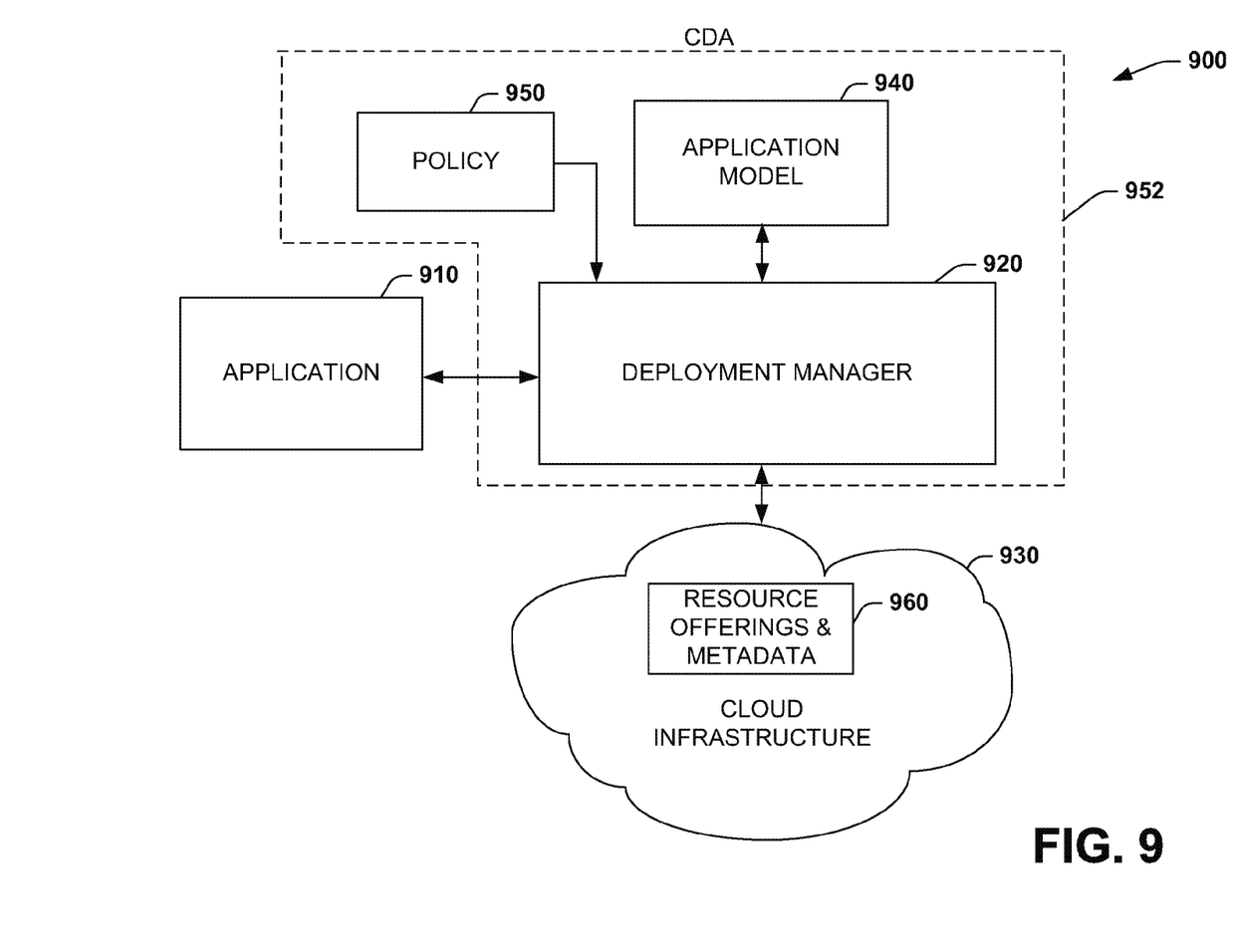
FIG. 9 illustrates an example of a system that interacts with a service framework layer and facilitates automated deployment for cloud applications.

FIGS. 5 and 6 illustrate service framework examples in which a service framework can be integrated with an automated deployment system (e.g., disclosed with respect to FIG. 9). Before proceeding with a detailed description of FIGS. 5 and 6, it is noted that FIGS. 5 and 6 offer a specific example of how asynchronous framework services can be created on top of an IAAS as described above and in cooperation with a continuous delivery automation (CDA) service which is described in more detail below with respect to FIG. 9. In this example, a cloud administrator can provision the cloud—e.g., deploy the IaaS layer on a data center or data centers. Then, a cloud architect can design topologies supported by the IaaS. These topologies can then be stored in a topology repository 502.

If multiple resource pools are involved, it can also be arranged according to the pools. Using the topology binder tool at 504, a CDA user at 506 can design (or the derivation could be automated) a binding for the respective topology of interest (e.g., to realize the infrastructure template selected by the CDA to bind to the application model—See FIG. 9 for discussion of application model). Then, the CDA 506 can select the binding and pass it to a topology provisioner 508 (built on the framework). This method can then orchestrate the calls to APIs of the IaaS API's (services) e.g., possibly in a given pool defined by domain/regions discussed below with respect to FIG. 7. Result of the provisioning can then return a realized topology instance that can be used to track what is instantiated (e.g., in a CMDB) and used to determine what to monitor/manage over time.

Referring initially to FIG. 5, an IaaS layer 510 interacts with various components of a service framework layer. The continuous delivery automation (CDA) system 506 (See FIG. 9 for description of CDA to automatically deploy applications) interacts with a developer and topology provisioner plug-in 508. As shown, the IaaS layer 510 can include a dashboard having topology binder 504 and provisioning components. The IaaS layer 510 can include network controllers, identity management components, object storage, cloud controllers, and image repositories, for example. The topology provisioner of the dashboard interacts with a resource pool registry 530, a topology repository 502, and the topology provisioner 508 of the framework to specify a given topology and resources, which in turn interact with the IaaS layer 510. An administrative interface 560 can include a topology designer, cloud provisioner, and administrative console for interaction with various components for the service framework layer. As shown, a developer or user at 570 can interact with the CDA 506. Similarly, a cloud administrator 580 or cloud architect 582 can interact with the administration interface 560.

FIG. 6 illustrates a similar system 600 to the system 500 in FIG. 5, wherein an IaaS component 610 does not include a dashboard interface for interacting with a service framework. In this example, a CDA system 620 interacts with a topology provisioner, which provides the interface to the IaaS layer 610. The topology provisioner 630 can interact with a topology repository 640, resource pool registry, 650, and topology provisioner plug-in 660. Other components of the system 600 can include a topology designer 670 and topology binder 680 to define and implement a given cloud topology. The system 600 can also include an administrative console 684 and cloud provisioner, as previously described.

Figure 7:
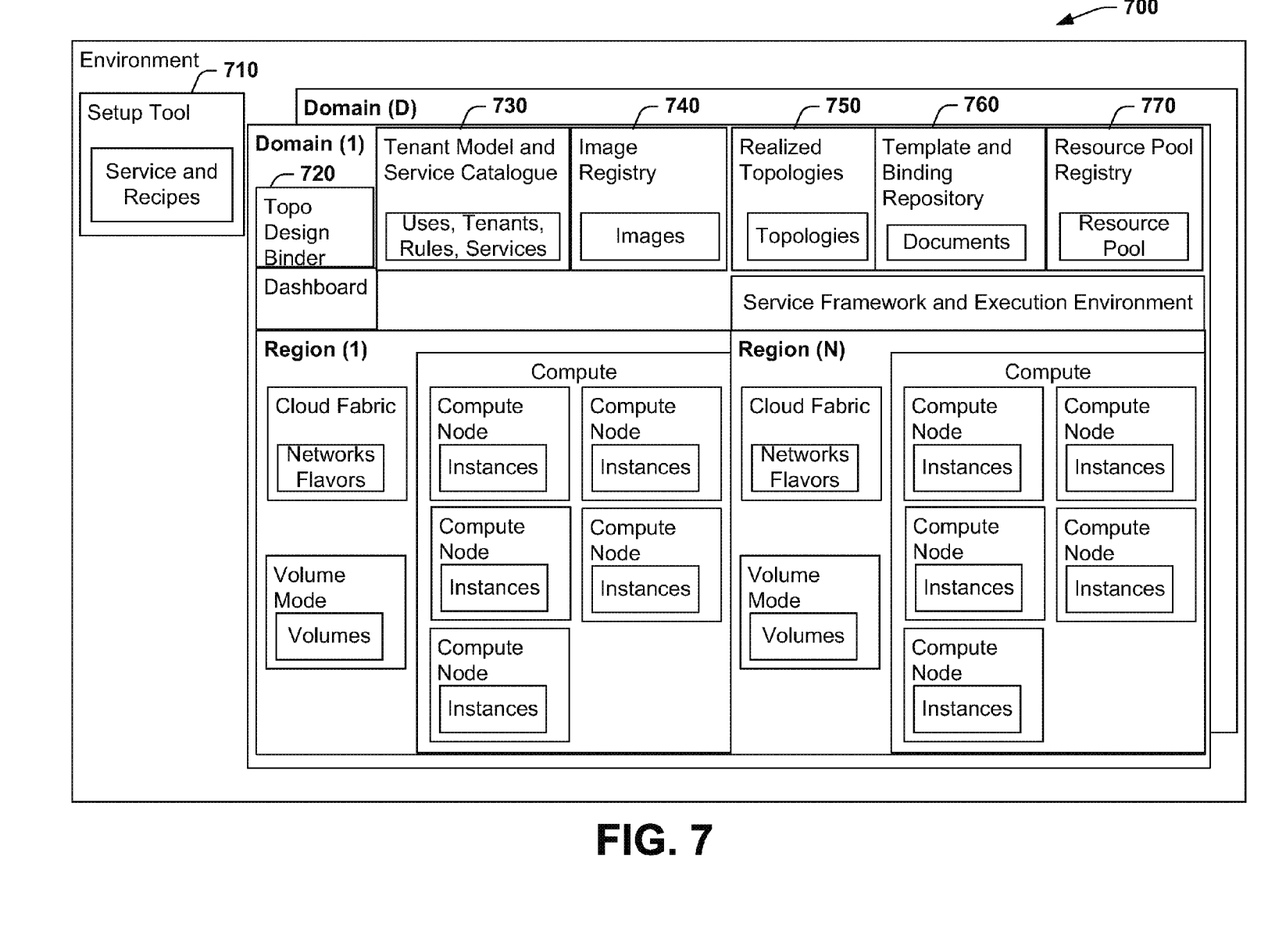
FIG. 7 illustrates an example of multitenant and hybrid configurations provided by a service framework layer.

FIG. 7 illustrates and example of multitenant and hybrid configurations provided by a service framework layer. In this example system 700, different domains can be associated with different clouds and/or different service providers or technologies to support hybrid configurations. Different regions, shown as region 1 and region N, N being a positive integer, can be associated to different technologies (heterogeneous) and/or tenants (Multi-tenancy segregation of resources) or other characteristics (e.g., security level, compliance level, openness to Internet level, specialization types, capabilities, and so forth). In some examples, each region can include different network configurations, different volume modes, and different computing nodes having differing or similar computing instances. In other examples, similar computing instances and/or resources can be shared across regions.

Each of the regions can belong to a domain, which is shown as Domain 1 in this example. The system 700 can also support multiple domains as depicted as domain D, with D being a positive integer. Different domains could be different IaaS layers, or provided by different service providers or different data centers, for example. In another example, a framework service identifies a domain or a region to implement a multitenant cloud configuration, a hybrid cloud configuration, or a heterogeneous cloud configuration. In another example, a plug-in component can be configured for the IaaS layer per the domain or the region.

A setup tool 710 can configure various components as previously described such as a topology designer 720, tenant and model service catalog 730, an image registry 740, one or more realized topologies 750, a template and binding repository 760, and resource pool registry 770, wherein such components cooperate to form abstract topology and provisioning requests that can be implemented as commands by the service framework to the IaaS layer. The system 700 can include different plug-ins to IaaS that supports the topology differences (features or locations). This can include support for different domains and regions that support separation of resource pools and open stack or associated plug-ins for control. Similarly, support of different versions of IaaS (e.g., different version of Open Stack releases, Vmware, Amazon, Rackspace, HP matrix, Azure, and so forth) can be performed by using different domains for each release, for example.

Figure 8:
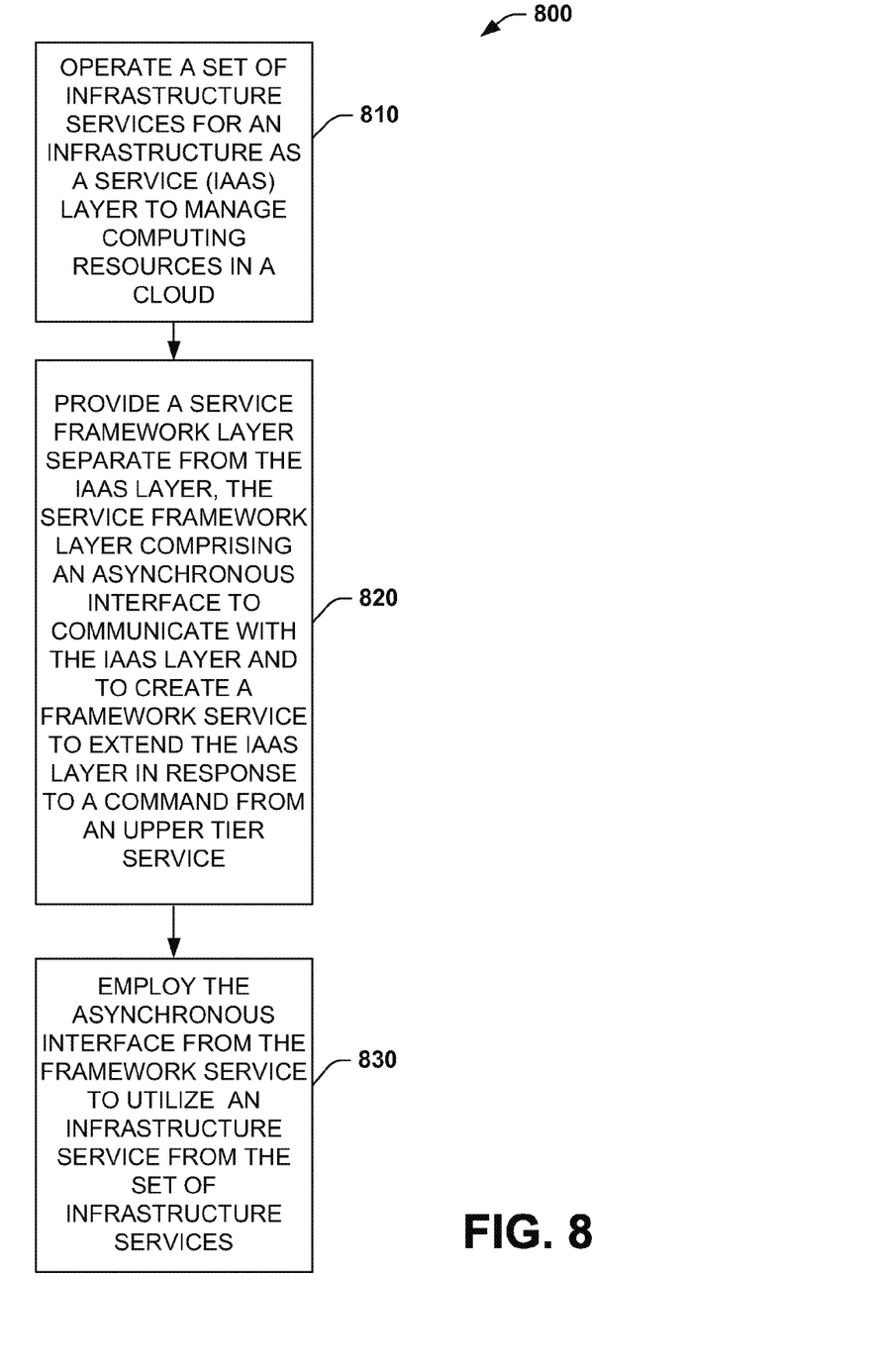
FIG. 8 illustrates a method for controlling an elemental Infrastructure as a Service layer for cloud applications.

In view of the foregoing structural and functional features described above, an example method will be better appreciated with reference to FIG. 8. While, for purposes of simplicity of explanation, the example method of FIG. 8 is shown and described as executing serially, it is to be understood and appreciated that the present examples are not limited by the illustrated order, as some actions could in other examples occur in different orders and/or concurrently from that shown and described herein. Moreover, it is not necessary that all described actions be performed to implement a method. The example method of FIG. 8 can be implemented as machine-readable instructions that can be stored in a non-transitory computer readable medium, such as can be computer program product or other form of memory storage. The computer readable instructions corresponding to the method of FIG. 8 can also be accessed from memory and be executed by a processing resource (e.g., one or more processing units that can exist on a single device or be distributed across multiple devices).

FIG. 8 illustrates a method 800 for controlling an elemental Infrastructure as a Service layer for cloud applications. The method 800 includes operating a set of infrastructure services for an Infrastructure as a Service (IaaS) layer to manage computing resources in a cloud at 810. At 820, the method includes providing a service framework layer, by the processor, separate from the IaaS layer, the service framework layer comprising an asynchronous interface to communicate with the IaaS layer and to create a framework service to extend the IaaS layer in response to a command from an upper tier service. At 830, the method 800 includes employing the asynchronous interface from the framework service to utilize an infrastructure service from the set of infrastructure services. The method can also include employing the asynchronous interface with the framework service and the processor to control an Open Stack service.

FIG. 9 illustrates an example of a system 900 that interacts with a service framework layer and facilitates automated deployment for cloud applications. The system 900 can provide automated deployment of an application 910 by utilizing a deployment manager 920 to determine infrastructure capabilities of a cloud infrastructure 930 (also referred to as cloud 930) and also determining application requirements of the application 910 by analyzing an application model 940 and policy 950. After such determinations (via matching of application requirements with infrastructure e.g., manual or automatic matching), the infrastructure can be provisioned and then the application can be deployed and then can be further managed over the course of its lifetime.

When an application has been deployed based on the matching, the deployment manager 920 further can manage other aspects of the lifecycle of the application. For example, the deployment manager 920 can monitor feedback, and adjust the infrastructure resources based on such feedback. Additionally or alternatively, the deployment manager 920 can dynamically adjust the application model and corresponding policies based on such feedback or other detected events. Similarly, this can also include retiring older versions of application components (e.g., code, middleware (MW), databases, operating system (OS), and so forth) and installing new versions of components to enable continued deployment of the application in the cloud infrastructure 930.

The cloud 930 can be a hybrid such that it can be a combination of traditional Data Centers that are made to behave like infrastructure resources, private clouds (cloud technology developed on premise), public clouds (offered by service providers and managed cloud configurations (managed on premise or in a public cloud virtual private cloud). As used herein, the term application applies to a collection of components. In addition, the application can be characterized for each of its components by a set of artifacts (e.g., installer, executable, configurations and so forth, and a set of components that are installed and interact with each other (e.g., code, middleware (MW), databases, operating system (OS), and so forth). Also, as used herein, the term determining can include compiling, enumerating, and matching.

As used herein, the term "substantially" is intended to indicate that while the function or results of the term being modified are a desired or intended result that some variation can result. In this context, for example, the term "substantially match" describes a situation that the resulting analysis and comparison is performed to identify resources that are the same; however, in practice the match can correspond to a set of resources that sufficiently similar to enable deployment. Where more than one such set of resources might correspond to a match, the deployment manager can select a best matching set of available resources. Other approaches for selecting such match can be utilized.

The application model 940 can be employed to characterize a given application 910 for deployment on the cloud 930, such as through metadata descriptions for various components of the application. The deployment manager 920 can be implemented via instructions executable or data readable by a processor to analyze an application requirement for the given application 910 based on the application model 940 and a policy 950 (or policies) associated with the given application. As will be described below, the policy 950 can be provided to describe additional operating context for the application 910 (e.g., operate application after midnight, use only east coast servers, maintain load balancing between servers, deploy within a given network domain, ensure load is between specified limits on servers, ensure there are no upcoming maintenances within a given window, and so forth as well techniques to "measure closeness" of the matches). The deployment manager 920 can then determine infrastructure resources in the cloud 930 sufficient to fulfill the application requirement of the application 910 as specified by the model 940 and policy 950. As shown, the deployment manager, application model 940, and policy 950, collectively forma continuous delivery automation system 952 (CDA).

Infrastructure capabilities of the cloud 930 can be determined via resource offerings and metadata 960 associated with the cloud. For instance, a plurality of service providers supporting the cloud 930 can provide files that specify what types of resources they have available and metadata that describe properties of interest for the respective resource offerings (e.g., resource offering of three servers available with metadata specifying memory size and processor speeds, load (if already instantiated), location, tenancy terms, service level agreements (SLAs), scheduled maintenances, and so forth).

In one example, the deployment manager 920 can automatically deploy the given application 910 on the cloud 930 after the matching of application requirements of the application 910 to the capabilities of the cloud as specified by the resource offerings and metadata 960. In this type of example, it usually amounts to executing the instructions of other following examples described below (possibly by calling external systems that manage the lifecycle of the infrastructure and or of the applications). As noted previously, the term application 910 can include a set of components that are to be installed and executed (e.g., multiple tiered logic, user interface (UI), middleware (MW), database (DB), operating system (OS) in addition to the code to install and configure such components). Thus, the application 910 refers to these sets of components and artifacts which can also include repositories of such components and artifacts. The application can also be identified by pointers to the components and artifacts including individual pointers or pointers to a set of components. In another example, the deployment manager 920 can generate instructions to inform a system (or user) on how to deploy the given application 910 on the cloud 930. In either example, the deployment manager 920 automatically correlates requirements of the application 910 as specified by the model 940 and policy 950 with capabilities of the cloud 930 as specified by the resource offerings and metadata 960.

The system 900 utilizes a policy and model-driven approach to automate deployment as opposed to manual procedures of conventional systems. The system 900 can dynamically (or statically) optimize and bind infrastructure resources (characterized by metadata properties) to applications 910 based on models 940 and policies 950 that characterize their requirements in terms of infrastructure properties. This can include matching application metadata to resource metadata as well as taking into account policies and context to automate optimized or preferred/labeled deployment of applications and their components/dependencies on the cloud 930 without also requiring manual deployment steps. In one example, the system 900 allows tracking of instances while also supporting automated management of such instances (e.g., automated monitoring and feedback described below). Different techniques are provided to ingest, author, and design metadata that can also describe infrastructure templates, application models, and policies. Such instances can be stored in a database or repository (not shown) along with the application 910, application model 940, and policy 950.

The system 900 can employ closed feedback loops for monitoring applications. Such monitoring applications can be based on policy such as to scale up or scale down an application execution requirement, for example, as well as to notify appropriate recipients, such as users or system applications. In one example, listeners can be installed in various components to capture events from monitoring. Events received by listeners can trigger handlers that can generate lifecycle management operations on the system (e.g., scale up, scale down, move, de-provision, alert user or system, run another executable that may involve composition of the systems described herein and other applications, and so forth).

The system 900 can be implemented on one or multiple hardware platforms, wherein the modules in the system can be executed on one or across multiple platforms. Such modules can run on cloud technology (various forms/and hybrid clouds) or offered as a SaaS (Software as a service) that can be implemented on or off the cloud. Complex applications can be automatically deployed on required infrastructure without also requiring users to understand how to perform such operations. Policies 950 provide automated instructions for operating guidelines that help administrators mitigate deployment errors. Metadata can also be associated with the application by identifying the type of application (e.g., via UI or API), then the user does not need to understand the application characteristics. This approach allows "best practice", recommended or imposed deployment models for applications based on their association to metadata. Policies also allow separating the application characteristics from other contextual considerations (e.g., about user, about application, about infrastructure, about context, about that specific user, about that specific application, and so forth. This facilitates the reuse of the application models across numerous applications. Particularization can also be achieved via policies. This is also how for example the system impose that a specific set of characteristic values are fixed for a given application or version. For example, the system could apply a generic application model for web applications, yet in another case, explicitly specify a different model or certain values for the attributes of the model. Resources can also be provided from hybrid clouds (e.g., some resources provided from local databases and servers and some resources provided from Internet services).

What have been described above are examples. It is, of course, not possible to describe every conceivable combination of components or methods, but one of ordinary skill in the art will recognize that many further combinations and permutations are possible. Accordingly, the invention is intended to embrace all such alterations, modifications, and variations that fall within the scope of this application, including the appended claims. Additionally, where the disclosure or claims recite "a," "an," "a first," or "another" element, or the equivalent thereof, it should be interpreted to include one or more than one such element, neither requiring nor excluding two or more such elements. As used herein, the term "includes" means includes but not limited to, and the term "including" means including but not limited to. The term "based on" means based at least in part on.

What is claimed is:

1. A system comprising:
a processor;
a non-transitory computer-readable medium;
an infrastructure as a service (IaaS) layer, corresponding to instructions stored by the medium and executable by the processor, to provide a set of infrastructure services to manage computing resources in a cloud; and
a service framework layer, corresponding to instructions stored by the medium and executable by the processor, separate from the IaaS layer, the service framework layer comprising an asynchronous interface to communicate with the IaaS layer and to create a framework service to extend the IaaS layer in response to a command from an upper tier service, the framework service to employ the asynchronous interface to utilize an infrastructure service from the set of infrastructure services,
wherein the service framework layer interacts with an automated deployment component to implement a given topology by communicating with the IaaS layer, and wherein the given topology is realized by a plurality of dynamically loaded drivers, each driver matching a function interface or a binding definition received from the upper tier service.

2. The system of claim 1, wherein the service framework further comprises an application programming interface (API) to receive API requests from the upper tier service to extend the IaaS layer.

3. The system of claim 2, the upper tier further comprising at least one of a Web user interface, a command line interpreter (CLI) tool, or a service consumer application to generate the API requests.

4. The system of claim 2, further comprising a request processor to receive the API requests from a queue which initiates framework logic to address the API requests.

5. The system of claim 4, wherein the request processor defines a task that is put on the queue, where a request worker component processes the API requests and spawns framework tasks from the request worker to extend the IaaS layer.

6. The system of claim 5, further comprising a status pollster that monitors for at least one of completion or error results from the request worker component to indicate when a service framework task has been implemented.

7. The system of claim 2, wherein the API and service framework are employed as a pattern template to develop new services that extend the IaaS layer.

8. The system of claim 1, wherein the framework service implements a multitenant cloud configuration in accordance with the IaaS layer that as commanded from the upper tier service.

9. The system of claim 1, wherein the framework service implements a hybrid cloud configuration in accordance with the IaaS layer as commanded from the upper tier service, wherein the hybrid cloud configuration includes at least two clouds comprising a private cloud, a public cloud, or a managed cloud configuration.

10. The system of claim 1, wherein the framework service is to implement a heterogeneous cloud configuration in accordance with the IaaS layer that as commanded from the upper tier service, wherein the heterogeneous cloud configuration includes multiple hardware vendors in a cloud configuration.

11. The system of claim 1, wherein the framework service identifies a domain or a region to implement at least one of a multitenant cloud configuration, a hybrid cloud configuration, or a heterogeneous cloud configuration.

12. The system of claim 1, wherein the framework service is implemented across a computing domain or region specifying a computing resource in accordance with the corresponding infrastructure service of the set of infrastructure services.

13. The system of claim 1, wherein the IaaS layer is an OpenStack layer that is responsive to the command from the upper tier service to implement the given topology.

14. The system of claim 1, wherein the service framework layer instantiates the framework service to facilitate at least one of disaster recovery, capacity analytics, chargeback control, security control, memory backup capability, or memory restore capability.

15. A system comprising:
a processor;
a non-transitory computer-readable medium;
an infrastructure as a service (IaaS) layer, corresponding to instructions stored by the medium and executable by the processor, to provide a set of infrastructure services to manage computing resources in a cloud;
a service framework layer, corresponding to instructions stored by the medium and executable by the processor, separate from the IaaS layer, the service framework layer comprising an asynchronous interface to communicate with the IaaS layer and to create a framework service to extend the IaaS layer in response to a command from an upper tier service, the framework service to employ the asynchronous interface to utilize an infrastructure service from the set of infrastructure services; and
a topology provisioning service operating in accordance with the framework service to interact with the service framework layer to implement a given topology,
wherein the given topology is realized by a plurality of dynamically loaded drivers, each driver matching a function interface or a binding definition received from the upper tier service.

16. The system of claim 15, wherein the topology provisioning service creates topologies that describe infrastructure elements to be provisioned and relationships between the infrastructure elements.

17. The system of claim 16, wherein the topology provisioning service creates lifecycle management recipes that specify how the infrastructure elements and the relationships can be setup.

18. The system of claim 15, wherein the topology provisioning service employs a topology template abstraction interface and resource binding pool to generate a topology template and binding, wherein the binding includes identifying what pool and what service is to be used to realize the given topology.

19. The system of claim 18, wherein the given topology is abstracted to a set of functional steps that are loaded as the drivers in a driver set via a dynamic loader.

20. The system of claim 19, wherein the driver of each functional step that is dynamically loaded matches both the function interface and the binding definition received from the upper tier service.

21. A method comprising:
operating a set of infrastructure services, by a processor, for an Infrastructure as a Service (IaaS) layer to manage computing resources in a cloud;
providing a service framework layer, by the processor, separate from the IaaS layer, the service framework layer comprising an asynchronous interface to communicate with the IaaS layer and to create a framework service to extend the IaaS layer in response to a command from an upper tier service;
employing the asynchronous interface from the framework service to utilize an infrastructure service from the set of infrastructure services,
interacting, by the service framework layer, with an automated deployment component to implement a given topology by communicating with the IaaS layer; and
dynamically loading each of a plurality of drivers realizing the given topology, each driver matching a function interface or a binding definition received from the upper tier service.

22. The method of claim 21, further comprising employing the asynchronous interface with the framework service and the processor to control an OpenStack service.

23. A system comprising:
a memory for storing computer executable instructions associated with a computer; and
a processing resource for accessing the memory and executing the computer executable instructions, the computer executable instructions comprising:
an infrastructure as a service (IaaS) layer, corresponding to instructions executable by the processing resource, to provide a set of infrastructure services to manage computing resources in a cloud computing environment;

a service framework layer, corresponding to instructions executable by the processing resource, separate from the IaaS layer, the service framework layer comprising an asynchronous interface to communicate with the IaaS layer and to create a framework service to extend the IaaS layer in response to a command from an upper tier service, the framework service to employ the asynchronous interface to utilize an infrastructure service from the set of infrastructure services; and an upper tier service, corresponding to instructions executable by the processing resource, to generate the command, wherein the command defines a potential topology to be implemented by the corresponding set of infrastructure services, wherein the given topology is realized by a plurality of dynamically loaded drivers, each driver matching a function interface or a binding definition received from the upper tier service.

24. The system of claim 23, further comprising instructions to generate a template that describes the topology and is processed by a topology service of the set of infrastructure services to generate the command.

* * * * *